No. 786,097. PATENTED MAR. 28, 1905.
N. CAMPBELL.
TIRE PROTECTOR.
APPLICATION FILED NOV. 28, 1904.
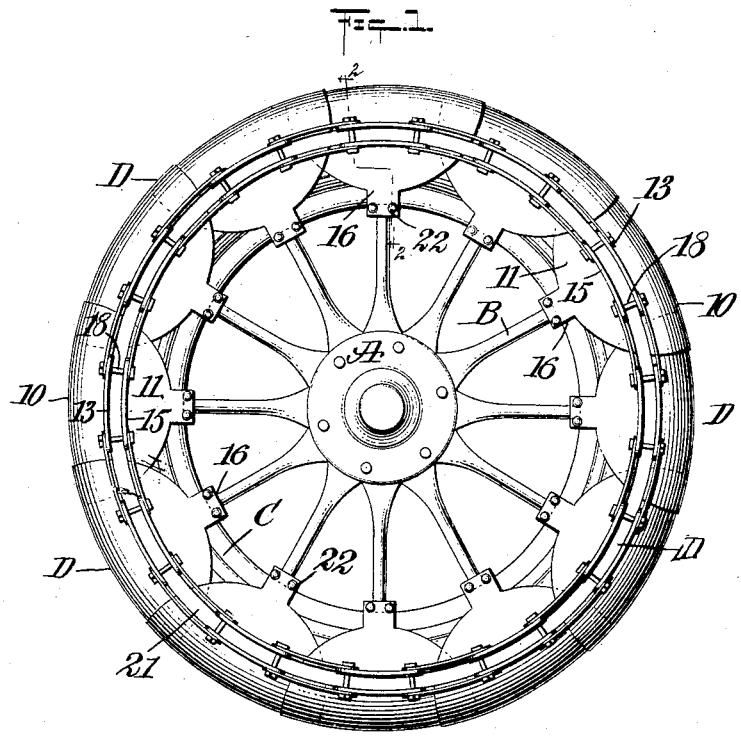
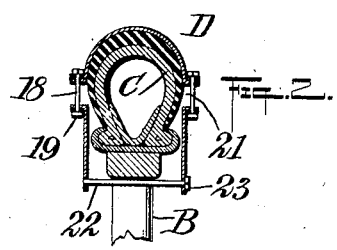
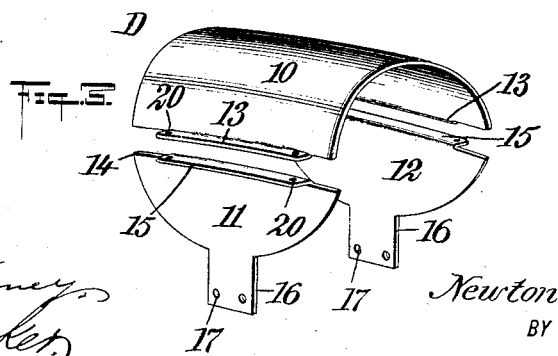
WITNESSES:
INVENTOR
Newton Campbell
BY
ATTORNEYS No. 786,097. Patented March 28, 1905.

UNITED STATES PATENT OFFICE.

NEWTON CAMPBELL, OF ELIZABETHTOWN, OHIO, ASSIGNOR OF ONE-HALF TO BENJAMIN HAYHURST, OF ELIZABETHTOWN, OHIO.

TIRE-PROTECTOR.

SPECIFICATION forming part of Letters Patent No. 786,097, dated March 28, 1905.

Application filed November 28, 1904. Serial No. 234,529.

*To all whom it may concern:*

Be it known that I, NEWTON CAMPBELL, a citizen of the United States, and a resident of Elizabethtown, in the county of Hamilton and State of Ohio, have invented a new and Improved Tire-Protector, of which the following is a full, clear, and exact description.

My invention relates to protective devices or armor for rubber tires, pneumatic, solid or partially solid, or such yielding or elastic tires as are used upon automobiles and other road-vehicles.

The purpose of the invention is to provide a simple and readily-applied device constructed in sections, one having limited movement over the other, which device when applied to a tire will completely cover and protect it from puncture and direct wear without in any manner detracting from the elastic qualities of the tire.

The invention consists in the novel construction and combinations of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a wheel having the improved protector applied. Fig. 2 is a transverse section through the protector, the tire, and the rim of the wheel, the section being taken practically on the line 2 2 of Fig. 1; and Fig. 3 is a perspective view of one of the sections of the protector.

A represents the hub of a wheel, B the spokes, and C the elastic or yielding tire, which may be of any known type. The protective device or armor is preferably made of thin steel, brass, or aluminium and consists of any suitable number of sections D, arranged to overlap one another to a greater or lesser extent throughout the entire circumference of the tire C, one section being capable of slight movement upon the other. The sections D are of like construction, and each section is made in three members—namely, a tread member 10 and two side members 11 and 12. The tread member is arched or segmental in cross-section and is of such dimensions and shape as to fit over the tread portion of the tire C and extend toward the hub A of the wheel at each side of the tire to a predetermined extent, as is shown best in Fig. 2. The tread member 10 is provided at each longitudinal edge with an outwardly-extending flange 13, said flanges being at right angles to the side faces of the said tread member, as is shown in Fig. 3.

Each side member 11 and 12 of a section D is preferably flat, as is shown in Fig. 3, but is of segmental form, and the straight edges 14 of the said side members are made to face the corresponding side edges of the tread member 10. A flange 15 is formed at the straight edge 14 of each side member 11 and 12, which flanges extend outward at right angles to said edges 14 and correspond to the flanges 13 on the tread member 10. Each side member 11 and 12 is also provided at the central portion of its inner or curved edge with an ear 16, the ears being in the same plane with the body of the side members, as is illustrated in Figs. 1 and 3. The ears 16 are provided with apertures 17 and are wider than the spokes B of the wheel, the width of the ears 16 being such that when brought to an engagement with a spoke an aperture 17 will be at each side of the spoke, as is shown in Fig. 1.

When the members of a section D are assembled, the side members 11 and 12 are connected with the tread member 10 by bolts 18, loosely passed through apertures 20 in the flanges 13 and 15, said bolts being provided with suitable nuts 19; but when a section D is placed upon the tire of the wheel there is always a space between the flanges 13 and 15, as is shown at 21 in the drawings, at which space the tire C is more or less visible. As stated, when the sections D are in position upon the tire of a wheel they overlap one another more or less at their ends, as is shown in Fig 1, and the ears 16 of each section will be in engagement with opposite sides of a spoke B of the wheel, and the sections D are held in position on the wheel by passing bolts 22, provided with nuts 23, through the apertures 17 in the lugs or ears 16, the bolts being then located at opposite sides of the spoke with which the lugs of a section may engage.

The flanges 13 and 15 of a section D do not meet until the weight of the vehicle is upon the section of which they form a part, and said weight causes the tread member 10 of the section under pressure to spring outward with the compression of the tire, as the said tread member 10 may slide freely on the connecting-bolts 18 as the wheel turns around.

Just as soon as a section D is relieved from the direct weight of the vehicle the tire naturally expands beneath the section and forces the tread member of said section out to its normal position, so that a machine equipped with the improved protector will have the same easy motion obtainable from a fully-exposed rubber tire, while at the same time the tires of the machine are perfectly guarded against puncture, and as the wear is entirely upon the protectors for the tires the lifetime of tires thus equipped is indefinitely extended.

Having thus described my invention, I claim as new and desire to secure by Letters Patent—

1. A protector for rubber tires, consisting of independent sections, each section comprising a tread member and side members, the adjacent portions of the tread and side members being normally spaced apart when the section is in position on the tire, means for loosely connecting the tread member and side members of each section, the said connecting means permitting of the sliding movement of the tread member, and means for securing the sections to a wheel.

2. A protector for rubber tires, consisting of a series of independent sections arranged to overlap, each section comprising a tread member and side members, flanges formed upon the tread and side members at their opposing edges, bolts loosely connecting said flanges, and means for connecting the side members of the sections to a wheel.

3. A protector for rubber tires, consisting of a series of independent sections overlapping at their ends, each section comprising a tread member and side members, the side members being provided with lugs at their inner edges, opposing flanges located at the opposing edges of the side and the tread members of a section, and bolts loosely passed through opposing flanges, the lugs on the side members being apertured to receive bolts, as set forth.

4. The combination with a wheel and a rubber tire thereon, of a protector consisting of a series of independent sections covering the said tire and arranged to overlap, each section comprising a tread member conforming to the tread-section of the tire, and opposing side members, flanges located at the opposing edges of the side and the tread members of the sections, bolts loosely passed through opposing flanges, lugs extending from the inner edges of the side members of the sections, which lugs engage with the spokes of the wheel, and fastening devices passed through the said lugs at opposite sides of the spokes, as described.

In testimony whereof I have signed my name to this specification in the presence of two subscribing witnesses.

NEWTON CAMPBELL.

Witnesses:
   ZELLIE M. JOHNSTON,
   ISABEL BROGAN.